US011945692B1

(12) United States Patent
Young et al.

(10) Patent No.: US 11,945,692 B1
(45) Date of Patent: Apr. 2, 2024

(54) ELECTRIC STAIR LIFT

(71) Applicants: Lewis Young, Greenville, SC (US); Hance Young, Greenville, SC (US)

(72) Inventors: Lewis Young, Greenville, SC (US); Hance Young, Greenville, SC (US)

( * ) Notice: Subject to any disclaimer, the term of this patent is extended or adjusted under 35 U.S.C. 154(b) by 0 days.

(21) Appl. No.: 18/048,958

(22) Filed: Oct. 24, 2022

(51) Int. Cl.
*B66B 9/16* (2006.01)
*B66B 9/08* (2006.01)
*B66D 1/46* (2006.01)
*B66D 1/74* (2006.01)

(52) U.S. Cl.
CPC ............ *B66B 9/083* (2013.01); *B66B 9/0846* (2013.01); *B66B 9/0853* (2013.01); *B66D 1/46* (2013.01); *B66D 1/7489* (2013.01)

(58) Field of Classification Search
CPC ......... B66B 9/08; B66B 9/083; B66B 9/0846; B66B 9/0853; B66D 1/46; B66D 1/7489
See application file for complete search history.

(56) References Cited

U.S. PATENT DOCUMENTS 2,516,726 A * 7/1950 Saxton .................... B66B 9/083 187/201
2,528,265 A * 10/1950 Cretors ................... B66B 9/083 187/406
2,563,260 A * 8/1951 Miller ..................... B66B 9/083 187/201
2,832,436 A * 4/1958 Roberts ..................... B62B 5/02 187/408
3,216,369 A * 11/1965 McKinney .............. B66B 9/083 104/183
3,428,145 A * 2/1969 Lyon ......................... E06C 7/16 182/103
3,500,963 A * 3/1970 Beutler ................... B66B 9/083 187/289
3,592,294 A * 7/1971 Allen ........................ B66F 9/02 187/241
3,891,062 A * 6/1975 Geneste .................... B66B 9/16 182/103
4,043,427 A * 8/1977 Ackerman .............. B66B 9/083 187/282
4,046,226 A * 9/1977 Flinchbaugh ........... B66B 9/083 187/202
4,345,669 A * 8/1982 Noall ...................... B66B 9/083 182/103
4,438,830 A * 3/1984 Born ....................... B66B 9/083 187/253
5,050,708 A * 9/1991 Wood .................... B66B 9/0838 187/201
5,105,741 A * 4/1992 Leary ...................... E01B 23/00 104/106
5,553,548 A * 9/1996 Eaton ..................... A61G 5/061 105/72.2

(Continued)

*Primary Examiner* — Michael A Riegelman
(74) *Attorney, Agent, or Firm* — Southeast IP Group LLC; Thomas L. Moses

(57) ABSTRACT

An electric stair lift system for transporting people and/or cargo up and down a flight of stairs includes a pair of parallel rails, a platform that is slidably engaged with the rails, an electric winch with a take-up spool, and pair of straps attached between the slidable platform and the take-up spool of the winch. In a preferred embodiment, the electric stair lift system is portable, so that it may be installed in such a way that it may be easily removed, stored and transported, as desired.

8 Claims, 10 Drawing Sheets

(56) References Cited

U.S. PATENT DOCUMENTS

| | | | | |
|---|---|---|---|---|
| 6,439,544 | B1 * | 8/2002 | Rosenberg | B66B 9/083 254/338 |
| 8,146,713 | B2 * | 4/2012 | Rosenthal | B66B 9/083 414/595 |
| 9,469,507 | B2 * | 10/2016 | Awerbuch | B66B 9/0846 |
| 9,751,724 | B2 * | 9/2017 | Ooms | B66B 9/08 |
| 10,081,980 | B2 * | 9/2018 | Birkert | E06B 9/04 |
| 10,889,471 | B2 * | 1/2021 | Novacek | B66B 31/006 |
| 11,292,695 | B2 * | 4/2022 | Eisenman | A61G 7/10 |
| 11,485,613 | B1 * | 11/2022 | Phillips | B66B 9/187 |
| 2007/0161460 | A1 * | 7/2007 | Katz | A63G 31/12 482/35 |
| 2008/0093176 | A1 * | 4/2008 | Rosenthal | B66B 9/083 187/241 |
| 2012/0261216 | A1 * | 10/2012 | Hrenchir | B66B 9/0846 187/201 |
| 2014/0182973 | A1 * | 7/2014 | Hutchins | B66B 9/08 187/245 |
| 2016/0159613 | A1 * | 6/2016 | MacDonald | E04F 11/064 187/245 |
| 2018/0086601 | A1 * | 3/2018 | Okonski | B66B 9/083 |
| 2019/0388286 | A1 * | 12/2019 | Ferlin | B66B 9/0846 |
| 2020/0102789 | A1 * | 4/2020 | Young | E06C 1/12 |
| 2020/0386049 | A1 * | 12/2020 | Kaiser | E06B 9/04 |
| 2023/0114231 | A1 * | 4/2023 | Kalisperakis | G06T 7/50 382/181 |

* cited by examiner

ELECTRIC STAIR LIFT

FIELD OF THE INVENTION

The present invention is directed to a stair lift device and method of using the device. More specifically, the present invention includes a stair lift device that is particularly suited to transport people and/or cargo upwardly and downwardly along a flight of stairs.

BACKGROUND OF THE INVENTION

Due to the advancement of age, as well as various other types of physical limitations and disabilities, many people suffer from reduced mobility, which affects their ability to go up and down stairs in their home. These mobility issues often require people to either relocate to a new home or to install expensive mobility solutions, such as elevators. Stair accidents in the United States exceed a million incidents annually and cause over twelve thousand deaths, which ranks second only to vehicle deaths. Efforts have been made to develop mechanical solutions to this problem, including devices that allow a person to be seated while a wall mounted carriage moves them up and down stairways, but such systems tend to be expensive to install and require permanent alterations to the stairway.

The following patents serve as examples of mechanical mobility solutions, and are hereby incorporated herein by reference, in their entireties:

U.S. Pat. No. 4,627,517 discloses a stair lift including a guide track and a tooth wheel driven by a motor for driving a platform that can negotiate binds along the staircase while maintaining a horizontal position of the platform.

WIPO Publication WO2018092125 A1 describes a stair lift device along a motorized dual track.

However, these devices suffer from various disadvantages, and there remains room for improvement in terms of cost, functionality, portability, and ease of use.

SUMMARY OF THE INVENTION

In one embodiment, the present invention includes an electric stair lift having a pair of rails disposed in parallel relation, wherein each rail includes a channel defined therein, so that the channels are facing upwardly from the rails. A plurality of transverse support members connect the first rail to the second rail, and may further include compression locks or clamps for removably securing the rails and lift assembly to a staircase. A movable platform preferably includes a horizontally oriented standing surface with a pair of handrail supports extending upwardly from either side of the standing surface, with handrails attached to top portions of the handrail supports. The movable platform also includes a pair of diagonal supports extending upwardly from a front portion thereof, and these diagonal supports each include a guide member that engages with the channel of the rails, so that the movable platform slides smoothly along the rails.

A winch includes a take up spool and preferably a pair of cables or straps, wherein a free end of each strap is attached to the platform. The winch is used to drive movement of the platform upwardly or downwardly from one landing of the staircase to a second landing thereof.

In another embodiment, a standard ladder may be utilized as the track system, and the rollers may be attached to the platform member so that they engage a channel or lip on the outer sides of the ladder. Other attachment means may be used to removably secure the electric stair lift to the stairway, including clamps, hooks, or any other suitable attachment means.

These and other features, aspects and advantages of the present invention will become better understood with reference to the following description and appended claims.

BRIEF DESCRIPTION OF THE DRAWINGS

The drawings and specific descriptions of the drawings, as well as any specific or alternative embodiments discussed, are intended to be read in conjunction with the entirety of this disclosure. The electric stair lift assembly may, however, be embodied in many different forms and should not be construed as being limited to the embodiments set forth herein; rather, these embodiments are provided by way of illustration only and so that this disclosure will be thorough, complete and fully convey understanding to those skilled in the art.

DETAILED DESCRIPTION

The present invention is directed to an electric stair lift system 10 for transporting people and/or cargo up and down a flight of stairs 12. In a preferred embodiment, the electric stair lift system 10 is portable, so that it may be installed in such a way that it may be easily removed, stored and transported, as desired, without damaging the staircase, floors, or other components of the stairway.

Reference is made herein in detail to various embodiments of the present invention, including one or more examples set forth below. Each example is provided by way of explanation of the invention, and the scope of the invention should not be limited by these examples. Indeed, it will be apparent to those skilled in the art that various modifications and variations may be made to the present invention without departing from the scope and spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

Figure 1:
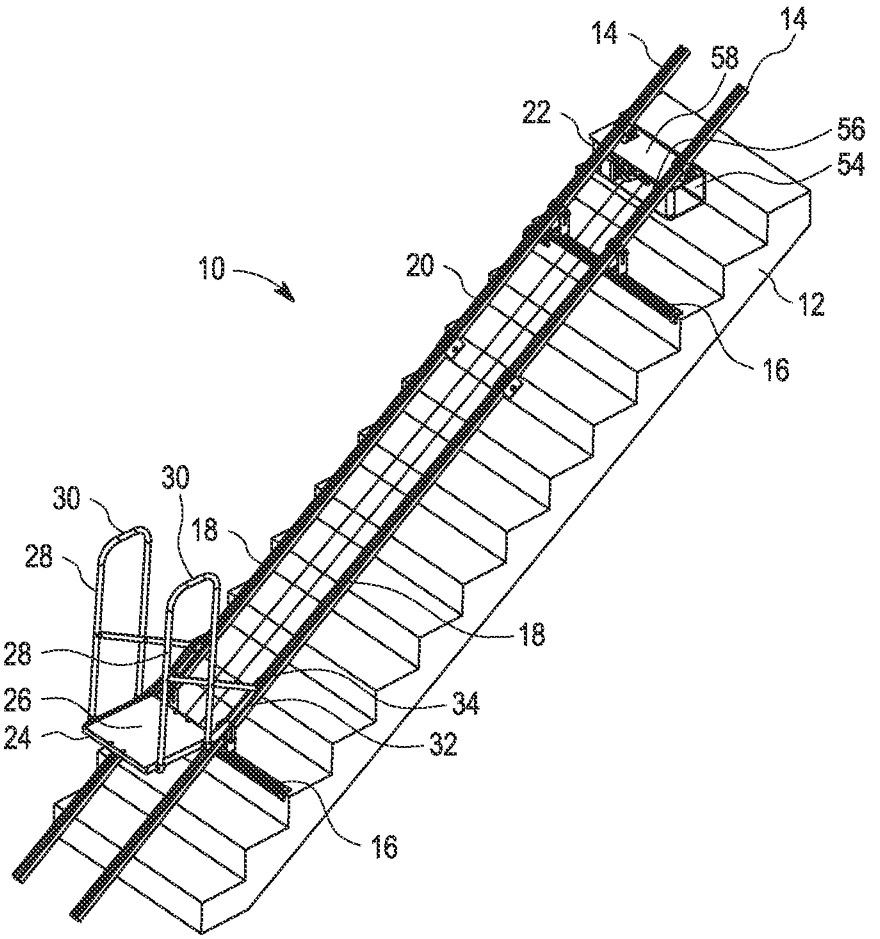
FIG. 1 is a perspective view of one embodiment of an electric stair lift, including a pair of rails disposed in parallel relation, each rail including a channel extending longitudinally along a top portion thereof, a pair of transverse support members attached to the rails for holding the rails securely in place, a movable platform slidably engaged along the rails, and a winch mechanism with a pair of straps for moving the movable platform upwardly and downwardly along the rails.
Figure 6:
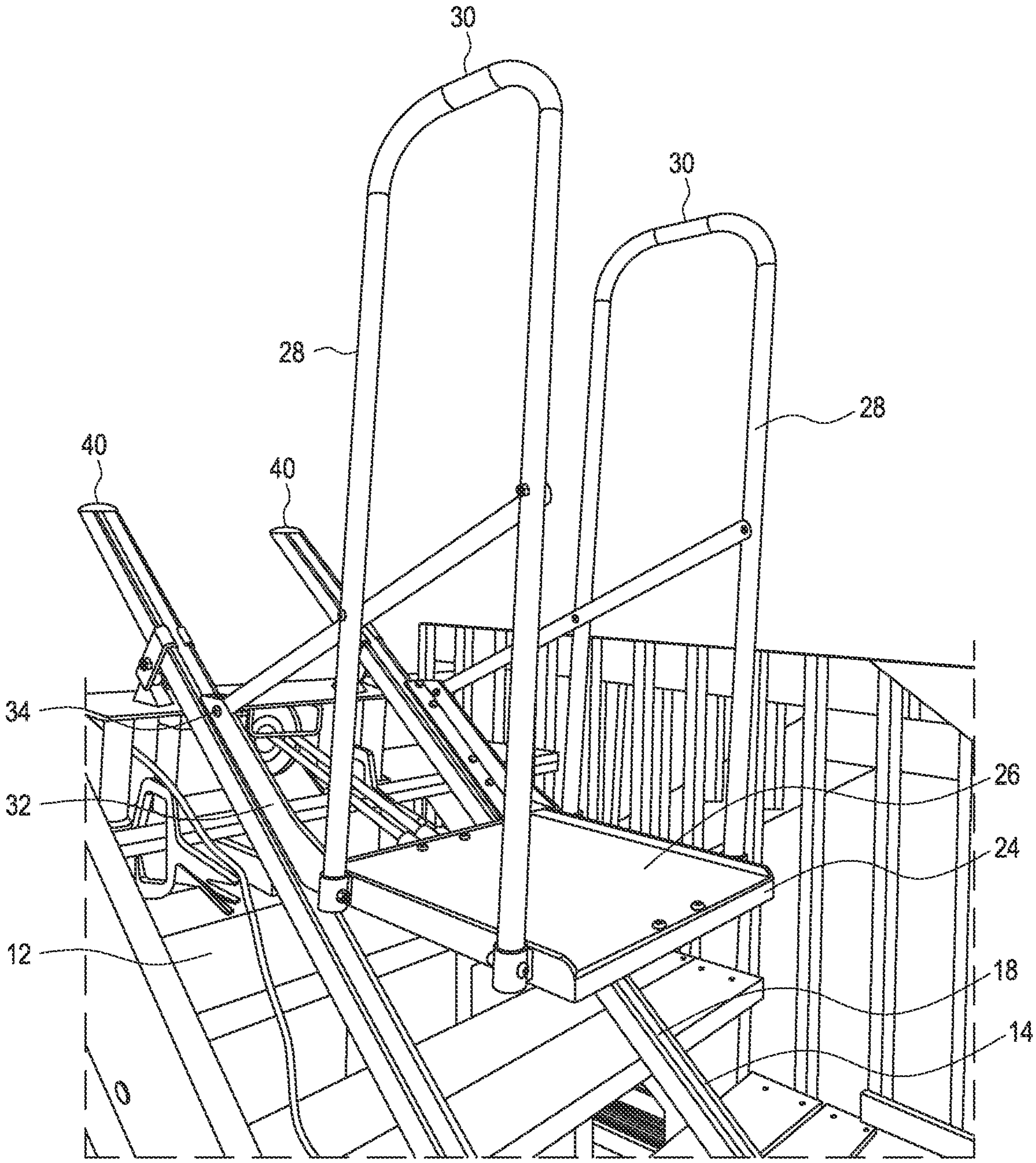
FIG. 6 is a perspective view of one embodiment of the electric stair lift, showing a pair of parallel rails defining channels or tracks therein, a platform member having handrail supports and handrails, and a winch member disposed within a housing, wherein the electric stair lift assembly is positioned on a stairway.
Figure 7:
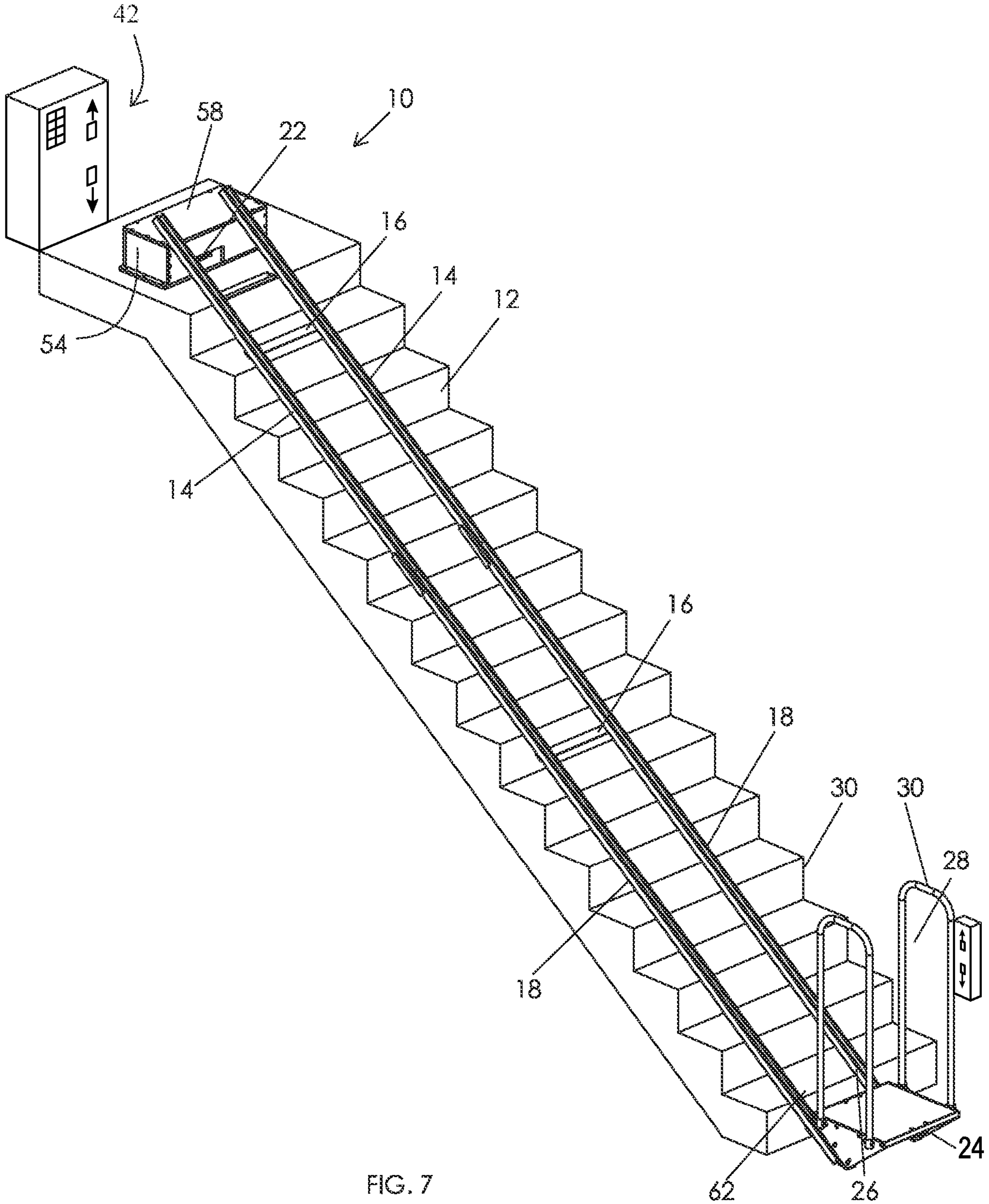
FIG. 7 is a perspective view of another embodiment of the electric stair lift, showing a pair of parallel rails defining channels or tracks therein, a raised platform member having handrail supports and handrails, and a winch member disposed within a housing, wherein the winch housing is positioned on top of a stairwell landing and the electric stair lift assembly is positioned on a stairway.
Figure 8:
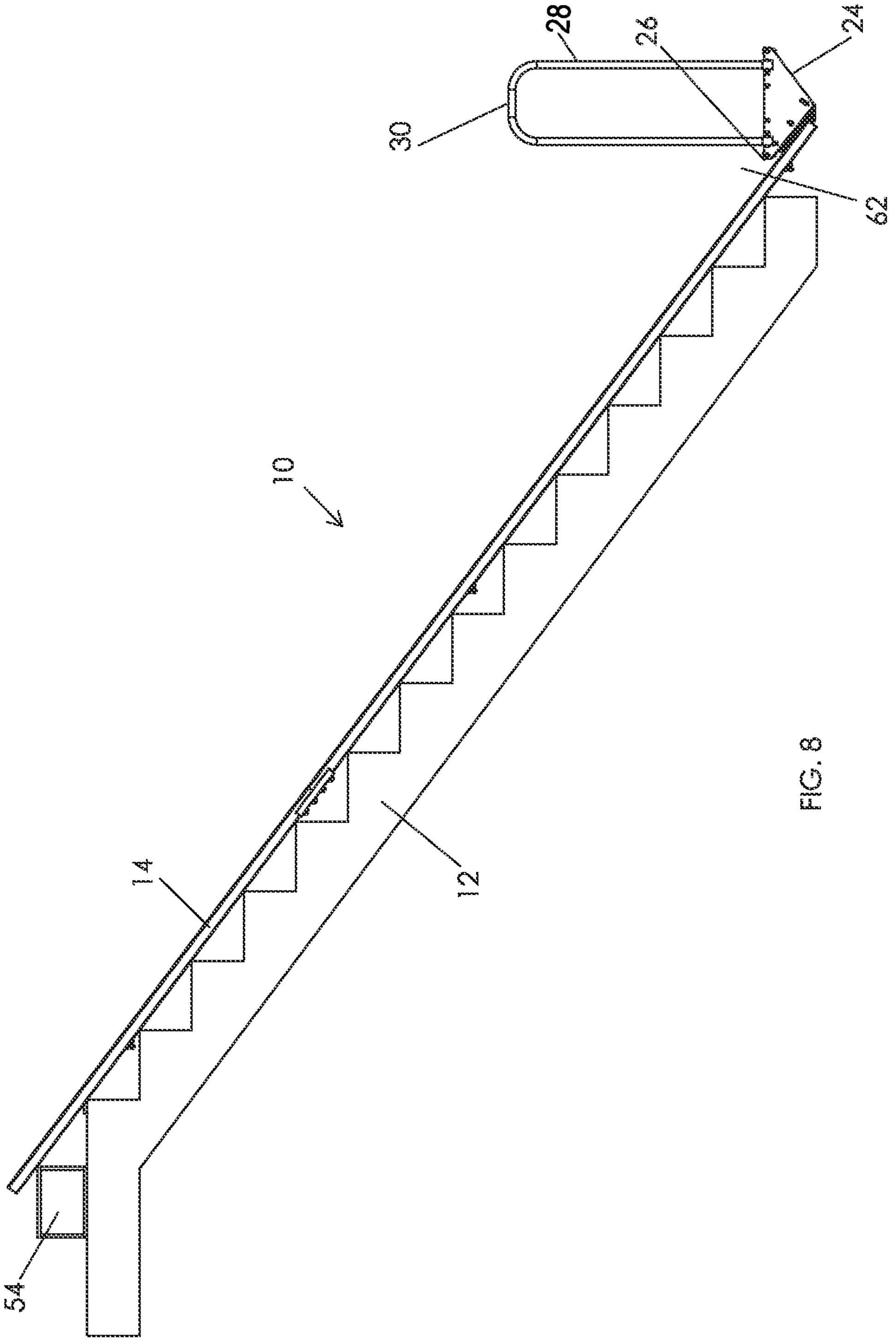
FIG. 8 is a side view of the embodiment of the electric stair lift shown in FIG. 7.
Figure 9:
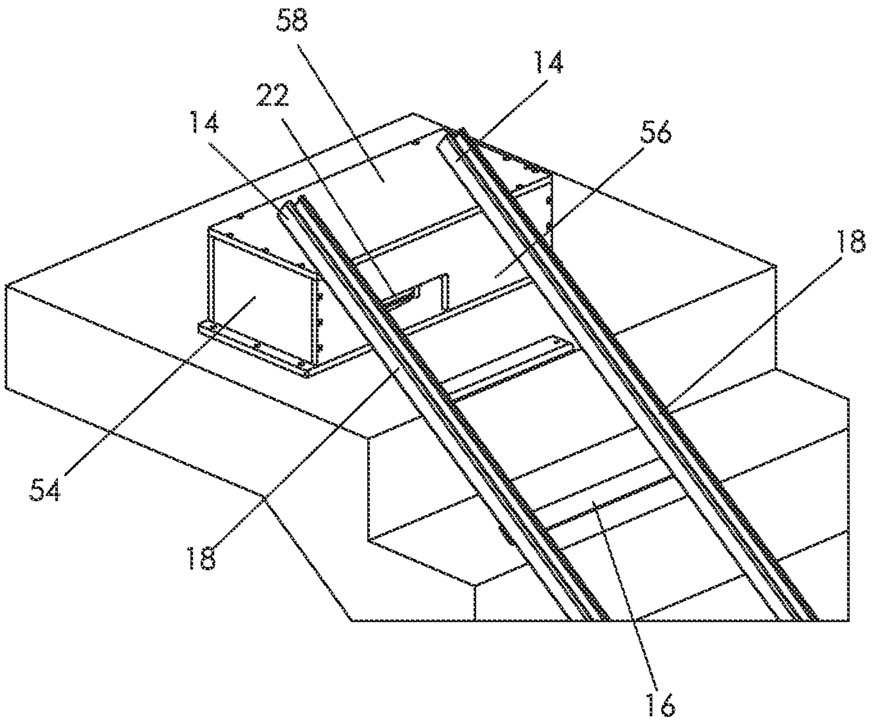
FIG. 9 is a perspective view of the upper portion of the embodiment of the electric stair lift shown in FIG. 7, wherein the winch housing and winch are disposed on top of a stairwell landing.
Figure 10:
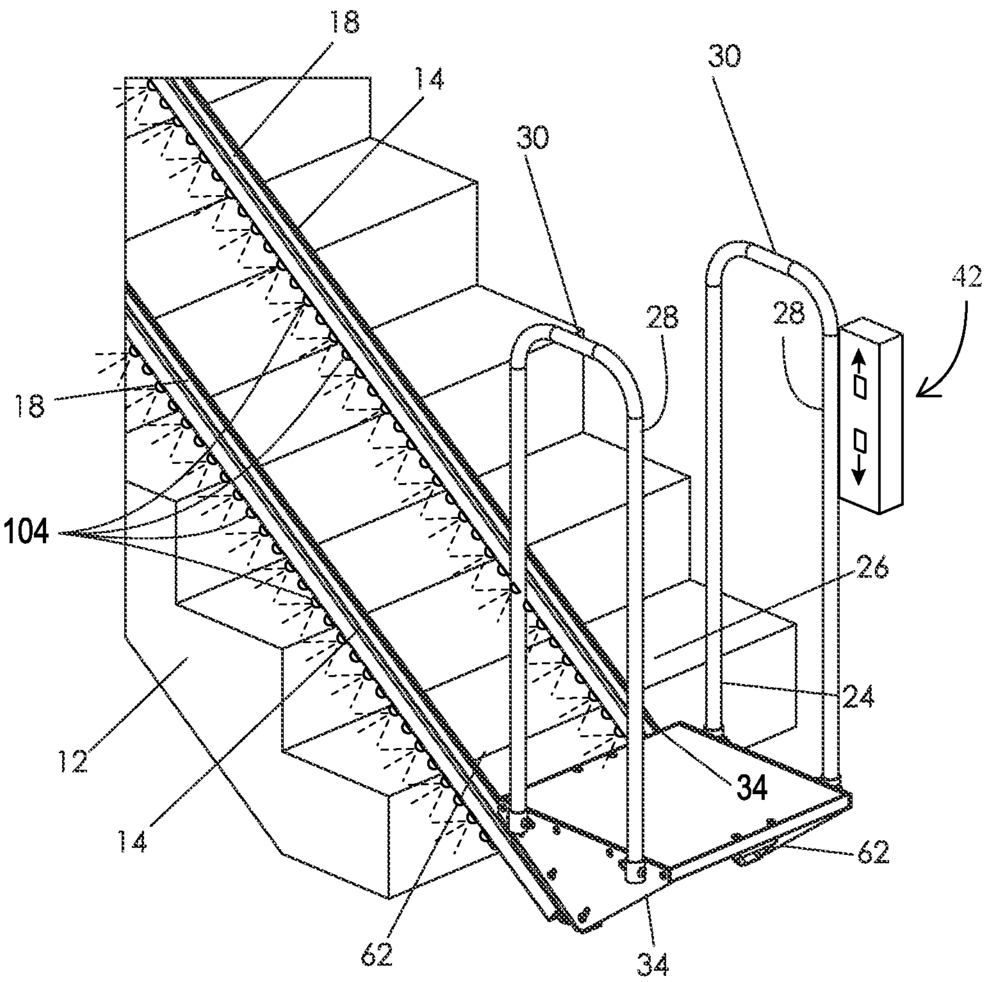
FIG. 10 is a perspective view of the lower portion of the embodiment not the electric stair lift assembly shown in FIG. 7, wherein the raised platform includes side supports having a lower guide member that engages the channels or tracks of the parallel rails.
Figure 11:
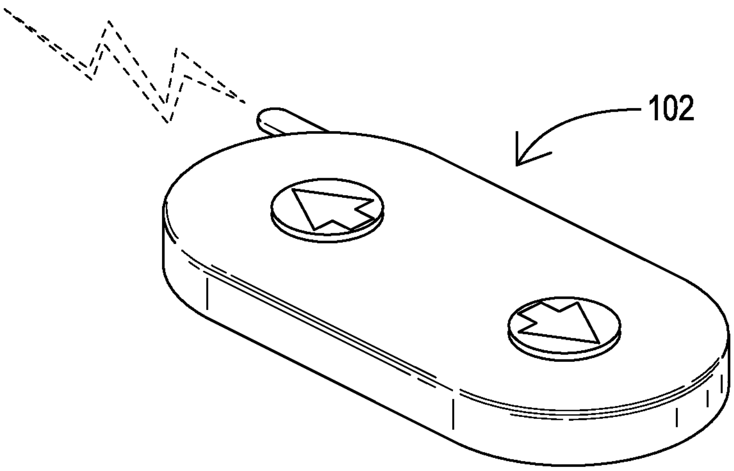
FIG. 11 is a perspective view of one embodiment of wireless remote control that may be used to control the electric stair lift.

As seen in reference to the Figures, FIGS. 1 and 6 show a first embodiment of an electric stair lift apparatus 10 having a first rail 14, a second parallel rail 14 and having transverse support members 16. Each rail 14 defines a three-sided channel 18 disposed longitudinally therealong.

Figure 3:
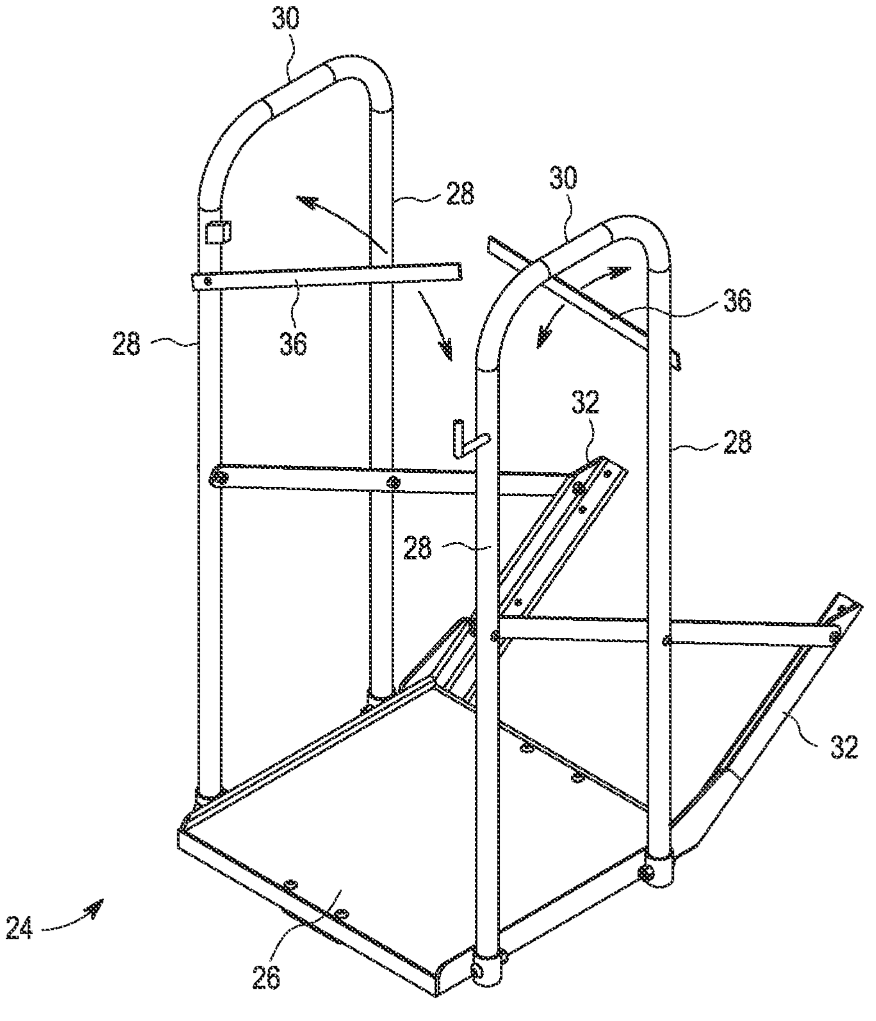
FIG. 3 is a perspective view of a platform member having a horizontally oriented standing surface, a pair of handrail supports extending upwardly from each side of the standing surface, a pair of handrails attached to the upper portion of the handrail supports, and a pair of diagonal supports extending from the front side of the horizontal platform for engaging the channels disposed in the rails.

The rails 14 support a strap 20 and winch 22 driven platform 24 having a standing surface 26 which a person may stand upon or which may optionally be modified to provide for a cargo carrier. The movable platform 24 preferably includes a horizontally oriented standing surface 26 with a pair of handrail supports 28 extending upwardly from either side of the standing surface 26, with handrails 30 attached to top portions of the handrail supports 28. The movable platform 24 also includes a pair of diagonal supports 32 extending upwardly at an angle from a front portion thereof, as shown in FIGS. 1 and 3, and these diagonal supports 32 each include a guide member 34 that engages with the channel 18 of corresponding rail 14, so that the movable platform 24 slides smoothly along the rails 14. Optionally, pivoting locking bars 36 may be disposed at the front and rear of the platform to provide protection against a user falling forward or backward on the platform 24, as shown in FIG. 3. The locking bars 36 may pivot between a horizontal position that serves to enclose a rider standing on the platform 24, and a vertical position to allow entry and egress from the platform 24 in either direction.

It is contemplated that, in one embodiment, the guide members 34 disposed on the diagonal supports 32 may include one or more rollers 38 that engage the corresponding channel 18, in order to provide a smooth motion for the movable platform 24.

A pair of straps 20 are preferably attached the movable platform 24 at one end thereof. The other end of each strap 20 is attached to a winch 22 having a take up spool. Having a pair of straps 20 employed to slide the movable platform 24 upwardly and downwardly along the rails 14 allows a margin of safety in the event that one of the straps 20 should break or become worn. Stop members 40 can be provided that stop the platform so that the standing surface 26 is substantially positioned in a horizontal plane with the upper most landing of the staircase.

Additional stop members 40 can be provided at the bottom of rails 14, which serve to secure the platform 24 in a stable position and allow for an easy step to the landing at the bottom of the staircase 12.

The electric stair lift apparatus 10 described above can be simply and easily installed to an existing staircase 12, does not require any modifications of side walls, and may be compatible with an existing rail systems on the staircase. Additionally, the electric stair lift 10 may be used to carry individuals or modified such that the platform 24 can be used as a cargo carrier. A control mechanism 42 may be incorporated into the handrails, or in any other desired location, for operation of the winch 22. Preferably, a wireless controller can be provided to operate the winch.

In another embodiment, a standard ladder may be used as the rail system, wherein the platform is slidably attached to the ladder. In this embodiment, the channels 18 may be positioned on the outer side of each rail 14, and the platform 24 includes rollers 38 attached thereto, so that the rollers 38 engage the channels 18 on the outer sides of the rails 14.

Figure 2:
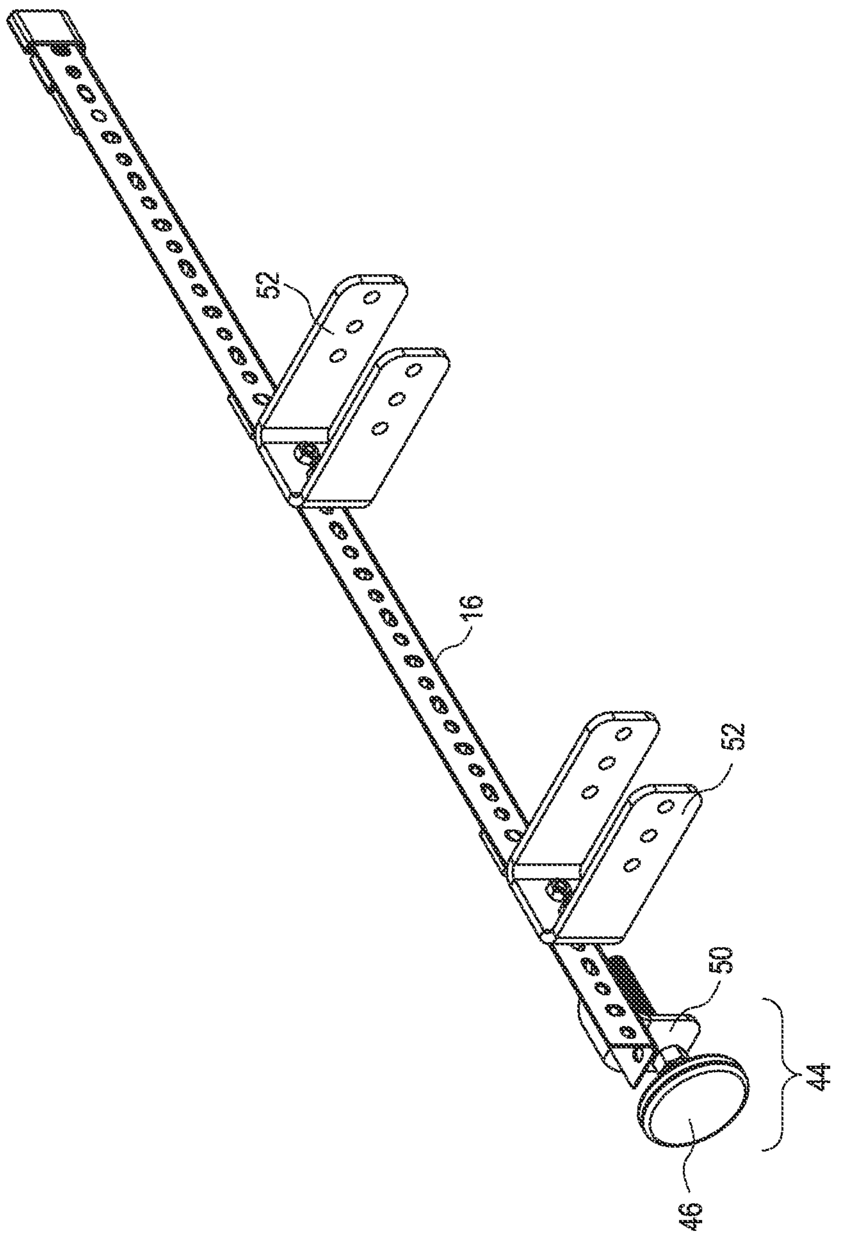
FIG. 2 is a perspective view of one embodiment of a transverse support member, including an L-shaped support member defining a series of holes along each longitudinal side thereof, a pair of bracket members for attachment to the rails, and at least one threaded compression member disposed at one end of the transverse support member for applying pressure against the wall of a stairway or the like for removably securing the electric stair lift assembly to a stairway.
Figure 4:
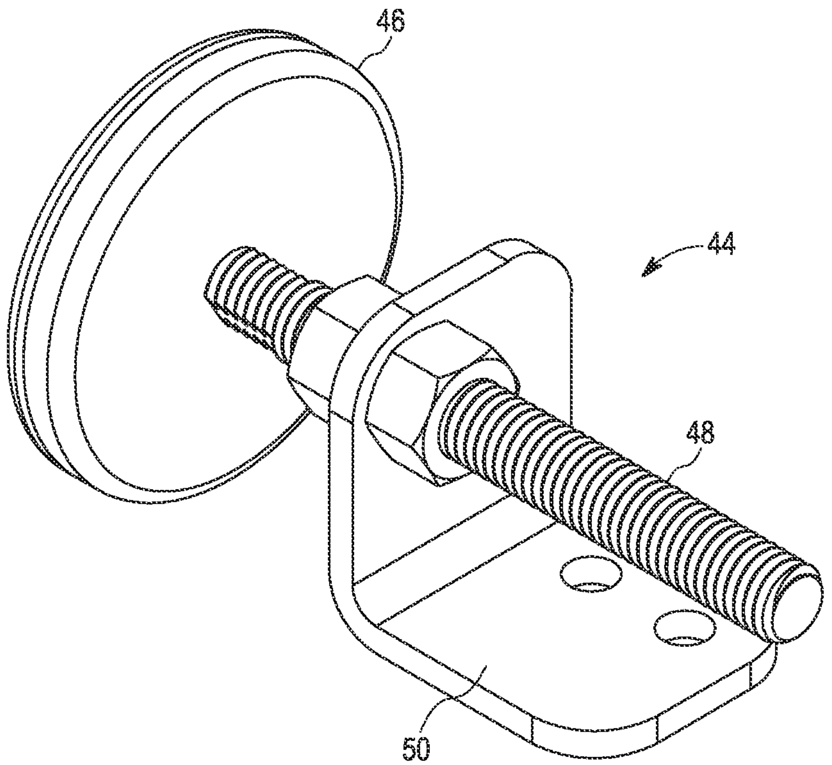
FIG. 4 is a perspective view of one embodiment of a compression lock that is disposed on at least one end of the transverse support member, wherein a round foot is attached to a threaded post, and is screwed into a threaded hole in a bracket that is attached to the transverse support member.
Figure 5:
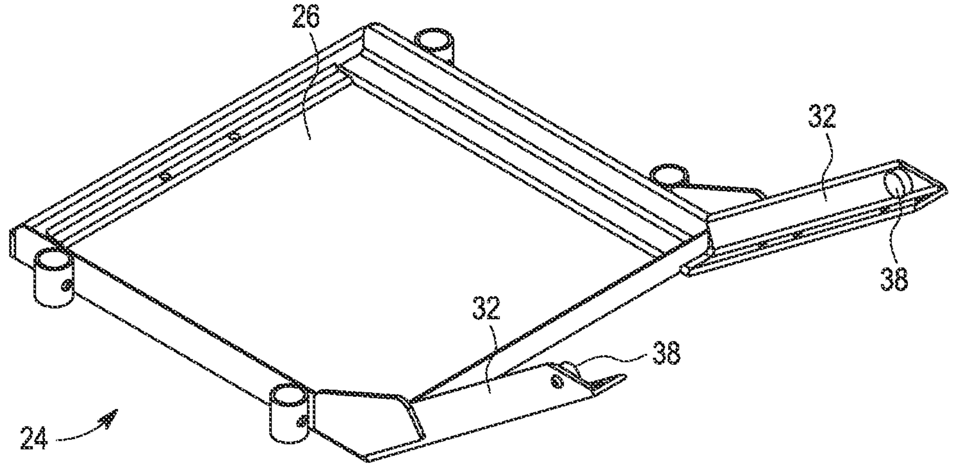
FIG. 5 is a perspective view of one embodiment of a platform member having a standing surface and a pair of diagonal supports with rollers for engagement with a channel set forth in a rail.

The rails 14 may include attachment means for removable attachment to a stairway. Such attachment means may include clamps, hooks, brackets or the like. In a preferred embodiment, the attachment means do not require nails, screws or other types of penetrating means to be driven into the stairs or other portions of a stairway, so that the installation and removal of the electric lift system does not damage or alter the stairway in any manner. One embodiment of such attachment means is shown in FIG. 4, which illustrates a compression member 44 (also referred herein as a "compression lock" or "compression clamp") that is attached to at least one end of the transverse support members 16. The round foot 46 of the compression member 44 is attached to a threaded post 48, which is screwed into a bracket 50 positioned at one end of the transverse support member 16. The foot 46 may be rotated to screw the compression member 44 inwardly or outwardly with respect to the bracket 50. The compression member 44 is screwed outwardly to provide pressure against the side walls (or other stationary supports) along a stairwell 12, in order to hold the rails 14 and the electric lift assembly 10 in place during use thereof. The transverse support members 16 also preferably include a series of holes for attachment of rail brackets 52, which are used to attach the rails 14 to the transverse support members 16. The rail brackets are adjustable by selecting specific holes along the transverse support member 16 as desired, and attaching the rail brackets to the transverse support members 16 in any desired position. Examples of transverse support members and compression locks are shown in FIGS. 1-2 and 4.

In a preferred embodiment, the winch 22 is positioned underneath the rails 14, either at the bottom of the stairway 12, or more preferably, at the top of the stairway 12 (on the top step, just below the upper landing, for instance, as shown in FIGS. 1 and 6). The winch 22 may be carried by a housing 54, including a lower plate 56 for carrying the winch 22, and an upper plate 58 that forms a step or landing that is preferably flush in a horizontal plane with the landing at the top of the staircase 12. A control mechanism 42 is preferably mounted on the handrail 30, so that a user may operate the electric lift system 10 while riding on the platform 24.

It is also contemplated that control mechanism 42 may be located at the bottom of the stairs 12, and at the top of the stairs 12. In this way, if a user is at the bottom of the stairs 12, and the platform 24 is at the top of the stairs 12, the user may use the control mechanism 42 at the bottom of the stairs 12 to bring the platform 24 down to the bottom of the stairs 12, so that the user may then board the platform 24 to ride up the stairs, for example.

It is also contemplated that the system may include wireless controls. For example, the system may have a Bluetooth or wifi transmitter/receiver, so that a user may operate the electric lift system from their smart phone or tablet. Alternatively, wireless remote controls similar to those used for televisions and entertainment systems may also be used to control the electric lift system 10. Wireless remote controls are ubiquitous today for any number of products and appliances, and those skilled in the art will understand and appreciate that any of these types of wireless remote controls may be used to control the lift system.

Optionally, the system may include a battery or power pack, such as a UPS (uninterrupted power supply), so that the platform 24 may be operated temporarily during a power outage. This battery-backup system is similar to those used on computers, to ensure that the computer remains operational and work is not lost in the event of a sudden power failure. Preferably, the power pack is disposed in the housing 54, along with the winch 22.

Optionally, the rails 14 may include lighting 104, either on the inner portion of the rails 14, on the outer portion of the rails 14, or along the transverse support members 16, in order to illuminate the stairway 12. In a preferred embodiment, the lighting 104 is placed on the outer side of the rails 14, so that the stairway 12 is illuminated on either side of the rails 14. It is, however, contemplated that the lighting 104 may positioned on the inner side of the rail 14, or in any other desired location.

In another embodiment, the platform 24 includes an upper plate 26 (also the standing surface in this embodiment) adapted for an individual to stand on, and a lower plate 60 that supports the upper plate. In this embodiment, the lower plate 60 is positioned below the upper plate 26, and is supported by one or more support rods which may have threadible feet extensions that can be used to vary the angle of the top plate to the bottom plate so as to maintain a horizontal surface which conforms to a parallel plane of the adjacent stairs or steps.

The lower plate 60 defines a plurality of upper rollers 38 engage an upper surface of the first rail 14 and second rail 14. The lower plate 60 further defines a plurality of lower rollers 38 adapted for engagement within respective inner channels 18 defined by the first and second rails 14. Each roller 38 preferably includes a surface groove that engages an edge portion of the channel. The winch 22 includes a take up spool and one or more straps 20, wherein a free end of each strap 20 is attached to a bottom surface of the lower plate 60 so that the platform 24 can support a person and/or cargo, and the winch 22 is used to drive movement of the platform 24 upwardly or downwardly from one landing of the staircase 12 to a second landing thereof.

Another embodiment of the present invention is shown in FIGS. 7-10. In this embodiment, the winch housing 54 and winch 22 are positioned on the top of a stairwell landing. The platform member 24 has a raised standing surface 26 and a pair of side supports 62 that are generally triangularly shaped. The front edge of each side support 62 includes a guide member 34 that engages the channel 18 of the corresponding rail 14, so that the platform member 24 may slide upwardly and downwardly along the parallel rails 14. In this embodiment, the standing surface 26 is raised so that, at the bottom of the stairway 12, a user must step up onto the standing surface 26. At the top of the stairway 12, the standing surface 26 is preferably generally flush with the top plate 58 of the winch housing 54, so that a user may step from the standing surface 26 to the top plate 58 of the winch housing 54, and down a step to the stairway landing.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A stair lift apparatus comprising:

a first rail and a second rail being disposed in parallel relation;

a plurality of transverse supports connecting the first rail to the second rail, said plurality of transverse supports having a first length and extending between said first rail and said second rail;

at least one transverse support having a second length that is greater than said first length and is adjustably attached to said first rail and said second rail in a lateral direction, and further includes a compression lock on at least one end thereof so that said compression lock is oriented in a generally horizontal direction for removably securing said rails to a stairway by providing an outward compression force exerted against opposed fixed vertical structures on opposed sides of said stairway;

a platform member having a standing surface adapted to support a user, said platform member being slidably engaged with said first and second rails;

a winch and at least one strap operatively attached to said winch, a free end of said strap being attached to said platform member, wherein said platform member supports the user on said platform that slides along said first and second rails, thereby transporting the user from one end of said stairway to a second end of said stairway.

2. The stair lift apparatus set forth in claim 1, further comprising a handrail attached to said platform member.

3. The stair lift apparatus set forth in claim 2, further comprising a controller affixed to said handrail, said controller being operatively connected to said winch for operating said winch to drive said platform upwardly and downwardly along said first and second rails.

4. The stair lift apparatus set forth in claim 1, further comprising a remote control that wirelessly communicates with said winch for operating said winch to drive said platform upwardly and downwardly along said first and second rails.

5. The stair lift apparatus set forth in claim 1, wherein said winch is disposed within a housing positioned adjacent an upper portion of said first and second rails.

6. The stair lift apparatus set forth in claim 1, wherein said platform member includes a pair of handrails, wherein each handrail is carried by a handrail support member.

7. The stair lift apparatus set forth in claim 6, wherein said platform member includes at least one pivoting locking bar attached to one of said handrail support members, wherein said pivoting locking bar may be pivoted between an open position and a closed position, so that when said locking bar is in said open position, a user may freely board and disembark from said standing surface of said platform member, and so that when said locking bar is in said closed position, said locking bar prevents boarding and disembarking from said standing surface of said platform member.

8. The stair lift apparatus set forth in claim 1, further including stop members positioned at an upper end of at least one of said rails, wherein said stop members are employed to stop said platform member at a desired position.

* * * * *